United States Patent
Barnes

(10) Patent No.: US 10,268,814 B1
(45) Date of Patent: Apr. 23, 2019

(54) PROVIDING SECURE ACCESS TO DIGITAL STORAGE DEVICES

(71) Applicant: Western Digital Technologies, Inc., Irvine, CA (US)

(72) Inventor: Edwin D. Barnes, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/972,013

(22) Filed: Dec. 16, 2015

(51) Int. Cl.
  G06F 21/36 (2013.01)
  G06F 21/62 (2013.01)
  G06F 3/0488 (2013.01)
  G06F 3/0482 (2013.01)
  G06F 21/31 (2013.01)

(52) U.S. Cl.
  CPC ............ *G06F 21/36* (2013.01); *G06F 3/0482* (2013.01); *G06F 3/0488* (2013.01); *G06F 21/31* (2013.01); *G06F 21/6218* (2013.01)

(58) Field of Classification Search
  CPC ....................................................... G06F 21/31
  See application file for complete search history.

(56) References Cited

U.S. PATENT DOCUMENTS

| | | | |
|---|---|---|---|
| 7,701,705 B1 | 4/2010 | Szeremeta | |
| 7,986,225 B1 * | 7/2011 | Edelstein | G08B 13/1436 340/521 |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,174,503 B2 | 5/2012 | Chin | |
| 8,185,709 B2 * | 5/2012 | Kim | G06F 21/80 711/163 |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 9,519,769 B2 * | 12/2016 | Azar | H04W 12/06 |
| 9,578,022 B2 * | 2/2017 | Salonen | H04L 63/0861 |
| 2005/0144443 A1 * | 6/2005 | Cromer | G06F 21/78 713/165 |
| 2007/0171921 A1 * | 7/2007 | Wookey | G06F 3/1415 370/401 |
| 2008/0209547 A1 * | 8/2008 | Funahashi | G06F 21/32 726/20 |
| 2009/0231271 A1 * | 9/2009 | Heubel | G06F 3/016 345/156 |

(Continued)

OTHER PUBLICATIONS

Datalocker DL2: User Manual; Mar. 2014.*

*Primary Examiner* — James R Turchen
(74) *Attorney, Agent, or Firm* — Chang & Hale LLP

(57) ABSTRACT

Systems and methods are disclosed for providing secure access to a data storage device. The data storage device may include a touch-sensitive input device (e.g., a touchscreen, a track pad, a touch pad, etc.). A user may provide touch input (e.g., taps and/or swipes) via the touch-sensitive input device. The data storage device may determine whether the touch input (e.g., tap/swipe input) is valid and may allow access to the data storage device (e.g., to non-volatile memory of the data storage device) when the touch input is valid.

21 Claims, 9 Drawing Sheets

(56) References Cited

U.S. PATENT DOCUMENTS

| | | | |
|---|---|---|---|
| 2009/0313693 A1* | 12/2009 | Rogers | G06F 21/36 726/21 |
| 2010/0077448 A1* | 3/2010 | Contino | G06F 21/78 726/3 |
| 2011/0156867 A1 | 6/2011 | Carrizo et al. | |
| 2011/0167391 A1* | 7/2011 | Momeyer | G06F 1/1684 715/863 |
| 2013/0067566 A1* | 3/2013 | Oh | G06F 21/31 726/19 |
| 2013/0219490 A1 | 8/2013 | Isbister et al. | |
| 2013/0276099 A1 | 10/2013 | Hoareau et al. | |
| 2014/0075547 A1* | 3/2014 | Kumai | G06F 21/36 726/18 |
| 2014/0078086 A1* | 3/2014 | Bledsoe | G06F 3/041 345/173 |
| 2014/0079221 A1* | 3/2014 | McCallum | H04L 9/0822 380/277 |
| 2014/0108822 A1* | 4/2014 | Yamaguchi | G06F 17/00 713/193 |
| 2014/0165186 A1* | 6/2014 | Ramu | G06F 21/31 726/19 |
| 2014/0245027 A1* | 8/2014 | Lee | G06F 21/74 713/193 |
| 2014/0245432 A1 | 8/2014 | Zhou | |
| 2014/0325681 A1* | 10/2014 | Kleidermacher | G06F 21/6218 726/29 |
| 2015/0035643 A1* | 2/2015 | Kursun | G07C 9/00134 340/5.52 |
| 2015/0058973 A1 | 2/2015 | Haberman | |
| 2015/0242657 A1* | 8/2015 | Kim | G06F 21/78 713/193 |
| 2015/0373010 A1* | 12/2015 | Zhang | H04L 63/083 726/7 |
| 2016/0050209 A1* | 2/2016 | Govande | H04L 63/101 726/7 |
| 2016/0057138 A1* | 2/2016 | Hoyos | G06T 7/73 726/7 |
| 2016/0062591 A1* | 3/2016 | Hwang | G06F 1/1694 345/173 |
| 2016/0204940 A1* | 7/2016 | Zachey | H04L 9/3226 713/193 |
| 2016/0259930 A1 | 9/2016 | Jerusalimsky | G06F 21/316 |
| 2017/0004293 A1* | 1/2017 | Mantri | G06F 3/017 |

* cited by examiner

PROVIDING SECURE ACCESS TO DIGITAL STORAGE DEVICES

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
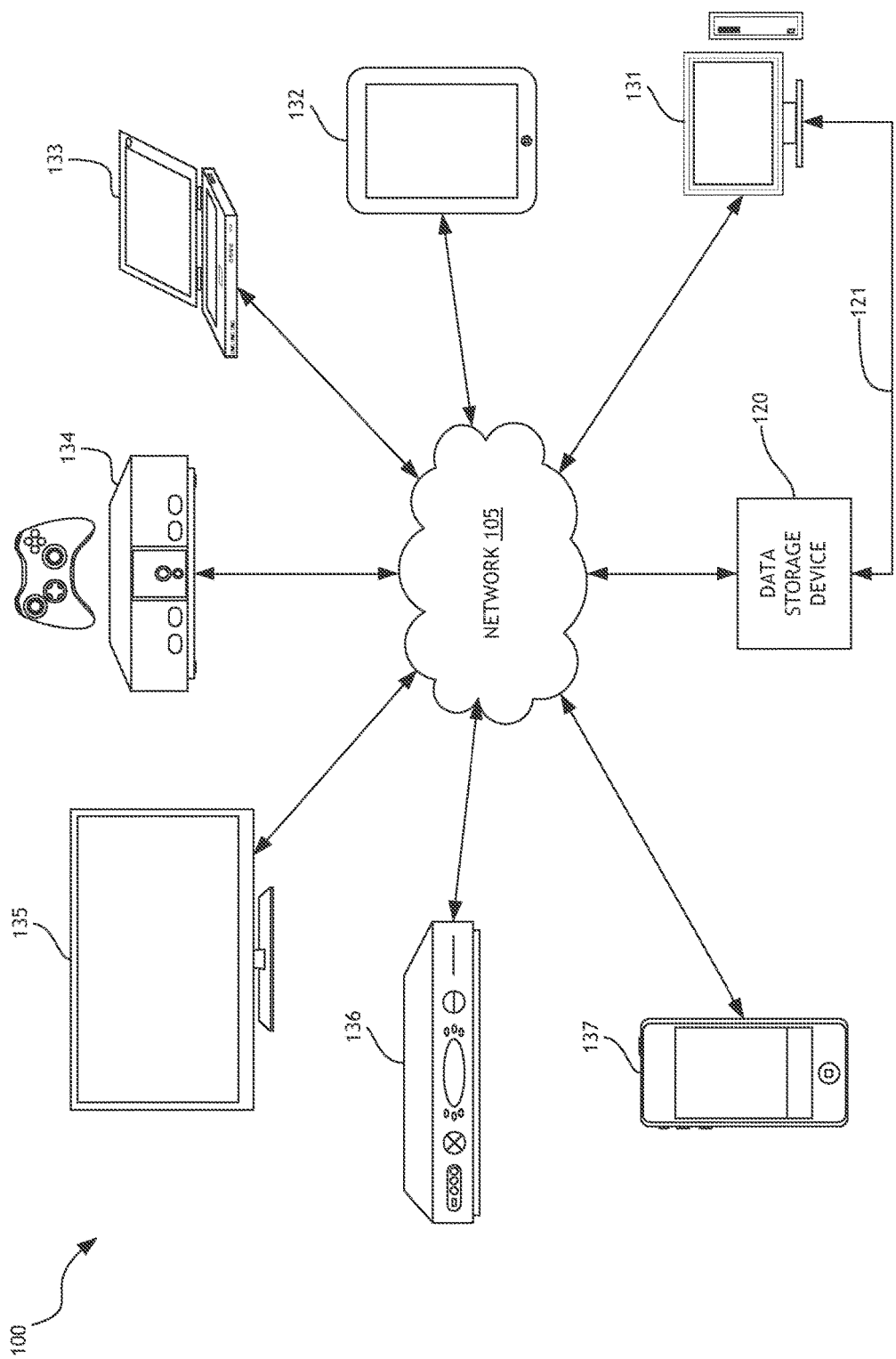
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to providing secure access to data storage devices.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a NAS interface (e.g., a network interface or a communication interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for providing secure access to a data storage device. The data storage device may include a touch-sensitive input device (e.g., a touchscreen, a track pad, a touch pad, etc.). A user may provide touch input (e.g., taps and/or swipes) via the touch-sensitive input device. The data storage device may determine whether the touch input (e.g., tap/swipe input) is valid and may allow access to the data storage device (e.g., to non-volatile memory of the data storage device) when the touch input is valid.

Data Storage Devices

FIG. 1 is a diagram of a data storage system 100, according to an embodiment. In the data storage system 100, a data storage device 120 may be communicatively coupled to one or more client devices (e.g., computing devices) in order to provide file-based data storage services to the one or more client devices (e.g., one or more computing devices). Types of client devices (e.g., computing devices) that may have access to the data storage device 120 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices. In one embodiment, the data storage device 120 may be an external standalone data storage device. For example, the data storage device 120 may be a data storage device that is not located within a computing device (e.g., not within a case or housing of a computing device). In another example, the data storage device 120 may be a data storage device that may provide access to data without being directly coupled to a computing device (e.g., may be a NAS device). The client devices (e.g., computing devices) may also be referred to as host systems. In one embodiment, the data storage device 120 may be a portable data storage device. The portable data storage device may lack a power source (e.g., may lack a battery and/or an AC adaptor) and may receive power from the client devices (e.g., host systems).

The data storage device 120 device may provide various client devices (e.g., phones 137, cable set-top boxes 136, smart TV's 135, video game consoles 134, laptop computers 133, tablet computers 132, desktop computers 131) with access to various types of user data stored on the data storage device 120. The data storage device 120 may also allow users to store various types of user data on the data storage device 120. The data storage device 120 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 120 (e.g., magnetic disk drive, hybrid hard drive, solid-state drive, etc.) may include a controller (not shown in FIG. 1) configured to receive data commands and to execute such commands in one or more non-volatile storage components of the data storage device 120. Such commands may include data read/write commands, and the like. The controller may be configured to receive data commands from a communication interface (e.g., a NAS interface and/or a DAS interface) residing on a computing device (e.g., a host system). Data commands may specify a block address in the data storage device 120 and data may be accessed/transferred based on such commands. The data commands may also be referred to as data access requests.

The data storage device 120 may be configured to store data in one or more magnetic recording disks and/or the solid state memory devices/arrays. In an embodiment, the data storage device 120 may comprise a cable box, a backup disk drive, a media storage unit, a streaming media device, a digital camera, or any other electronic device which may store data that may need to be accessed directly or wirelessly.

In certain embodiments, the data storage device 120 may store data received from a client device such that the data storage device 120 acts as data storage for the client device. To facilitate this function, the data storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 120. Mapping data indicating the mapping of logical addresses to physical memory addresses may be maintained in the data storage device 120.

In one embodiment, the data storage device 120 may be a DAS device. The DAS device may be directly coupled to client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., data storage device 120). In another embodiment, the data storage device 120 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Although FIG. 1 illustrates the data storage device 120 as being coupled to the client device 131, the data storage device may be coupled to any number of the client devices 131-137 via one or more connection cables in other embodiments.

In one embodiment, the data storage device 120 may receive data access requests from the client devices 131-137 via the communication interface (e.g., a DAS interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 120. In another example, a data access request may indicate that a computing device wants to write data to the data storage device 120.

Many data storage devices use a separate application (e.g., an app, software, etc.) that is installed on a computing device to provide secure access to the data storage devices. For example, a computing device may use an application (e.g., an unlocker/unlocking application) to encrypt/decrypt data on a data storage device that is coupled to the computing device. In another example, the computing device may use the application to allow/prevent access to data stored on the data storage device. The application may allow and/or prevent access to the data storage device based on a password provided by the user. Because the application is installed on the computing device, different versions of the application may be used for different operating systems. In addition, because an application is used to allow/prevent access to the data storage device, the data storage device may not be bootable (e.g., may not be used as a boot device)

It may be useful to provide a data storage device that is able to provide secure access to the data storage device (e.g., is able to encrypt/decrypt data, is able to allow/prevent access to data stored on the data storage device, etc.) without using an application (e.g., a separate application) installed on a computing device. This may allow the data storage device to be used with a wider variety of computing devices with different operating systems because the computing devices may not use an application to provide secure access to the data storage device.

Data Storage Device with Touch-Sensitive Input Device

Figure 2:
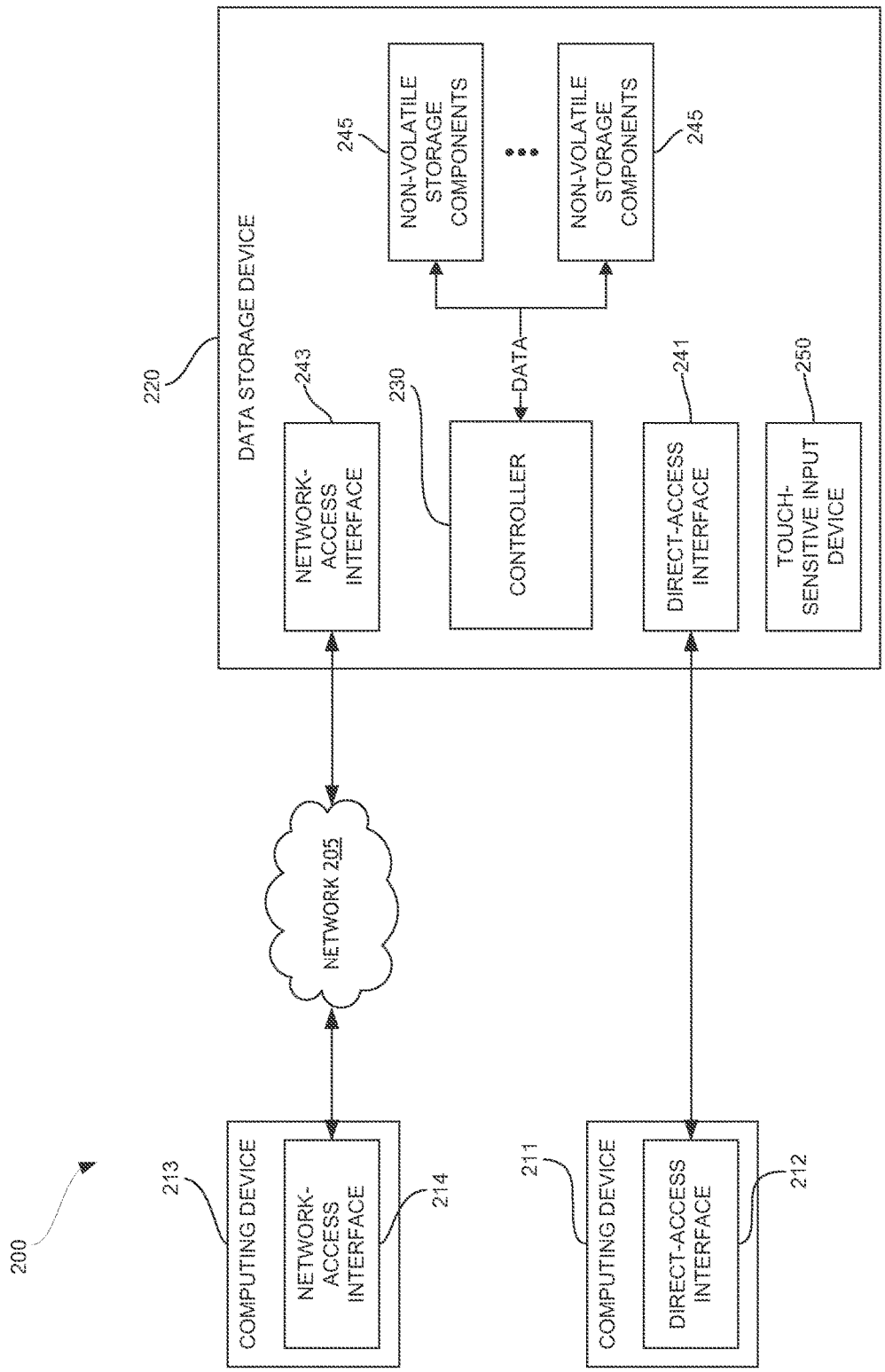
FIG. 2 is a diagram of a data storage system, according to an embodiment.

FIG. 2 is a diagram of a data storage system 200 according to an embodiment. The data storage system 200 includes a computing device 211, a computing device 213, a connection cable, and a data storage device 220. Each of the computing devices 211 and 213 may be a laptop computer, a desktop computer, a server computer, a tablet computer, a smart phone, a set-top box, a smart TV, a video game console, etc. The computing devices 211 and 213 may also be referred to as host systems. The data storage device 220 may include a controller 230, a direct-access interface 241 (e.g., USB 2.X, USB 3.X, Thunderbolt, eSATA, etc.), a network-access interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In one embodiment, the data storage device 220 may be a portable data storage device. The portable data storage device may lack a power source (e.g., may lack a battery and/or an AC adaptor) and may receive power from the computing device 211 (e.g., a host system).

In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors. In one embodiment, the data storage device 220 may be external standalone data storage devices (e.g., NAS devices/drives, portable external hard drives, etc.). In another embodiment, the data storage device 220 may be a portable data storage device. For example, the data storage device 220 may be a portable external hard drive. In another embodiment, data storage device 220 may receive power from the computing device 211 via a connection cable and the direct-access interfaces 212 and 241. For example, the data storage device 220 may not include a power source (e.g., a battery, a power adaptor, etc.) and may operate using power (e.g., voltage, current, etc.) received from the computing device 211 (e.g., a host system).

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify a LBA, or range of LBAs, in the data storage device 220, and the controller 230 may execute the received data access requests in the non-volatile storage components 245. The controller 230 may also receive data access request from a NAS interface 214 (e.g., a communication interface such as an Ethernet interface, a Wi-Fi interface, etc.) of the computing device 213. The controller may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via a connection cable. The connection cable may directly connect the computing device 211 and the data storage device 220. The connection cable may use one or more communication interfaces (such as a bus interface) and/or protocols that may allow the computing device 211 to communicate with the data storage device 220. The direct-access interfaces 212 and 241 may be USB interfaces, Thunderbolt interfaces, serial attached SCSI (SAS), eSATA interface, etc.

In one embodiment, the connection cable may include one or more data lines (e.g., one or more wires, pins, etc.) that allow the computing device 211 to communicate data with the data storage device 220. For example, the connection cable may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the direct-access interface 241. In a further embodiment, the data storage device 220 may be coupled to a separate power source (e.g., may be coupled to a battery, to an AC adaptor, to a wall outlet, etc.).

In one embodiment, the connection cable may include a bridge unit (not shown in FIG. 2). For example, the connection cable may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., a communication interface an Ethernet interface, a Wi-Fi interface, etc.) and the network 205. The data storage device 220 may receive the data and/or data access requests from the computing device 213 via the network-access interface 243.

In one embodiment, the data storage device 220 may include an encryption module (e.g., software, hardware, firmware or a combination thereof) that may encrypt/decrypt data (e.g., files) stored on the non-volatile storage components 245. For example, the encryption module may use encryption keys and/or encryption functions/algorithms to encrypt and/or decrypt data. In another embodiment, the data storage device 220 may include various sensors such as a compass (e.g., a magnetometer), a gyroscope, an accelerometer, a global positioning system (GPS) sensor, etc.

The data storage device 220 also includes a touch-sensitive input device 250. The touch-sensitive input device may be a device, component, module, etc., that receives touch input from a touch object. In one embodiment, touch input may include tap input (e.g., taps) and/or swipe input (e.g., swipes). Example of a touch-sensitive input device may include, but are not limited to, touchscreens (e.g., LCD touchscreens, capacitive touchscreens, resistive touch screens, etc.), touch pads, track pads, etc. Examples of touch objects may include a finger of a user, a stylus, an object with a capacitive tip, and/or an object that may be used to apply pressure to the touch-sensitive input device 250. Touch input may be referred to as a tap input, swipe input and/or tap/swipe input.

In one embodiment, the controller 230 may receive touch input from a user (of the data storage device 220) from the touch-sensitive input device 250. For example, the controller may receive one or more tap inputs (e.g., taps) and/or one or more swipe inputs (e.g., swipes) from the touch-sensitive input device 250. The controller 230 may determine whether the one or more tap inputs and/or one or more swipe inputs are valid, as discussed in more detail below. If the one or more tap inputs and/or the one or more swipe inputs are valid. The controller 230 may allow access to the data storage device (e.g., allow access to the non-volatile storage components 245), as discussed in more detail below. The tap inputs and/or swipe inputs (e.g., tap/swipe inputs) may also be referred to as a password, a touch-based password, a touch password, etc.

In one embodiment, the controller 230 may prevent access to the data storage device (e.g., prevent access to the non-volatile storage components 245) when one or more tap inputs and/or one or more swipe inputs are not valid (e.g., when the password or touch password is not valid), as discussed in more detail below. For example, the controller 230 may refrain from decrypting encrypted data stored on the non-volatile storage components 245 (e.g., may not decrypt the encrypted data). In another example, the controller 230 may not allow data to be communicated via the network-access interface 243 and/or the direct-access interface 241.

In one embodiment, the controller 230 may determine a number of access attempts to the data storage device 220. For example, the controller 230 may track the number of times that invalid tap/swipe inputs have been received from a user (via the touch-sensitive input device 250) trying to access the data storage device 220, using a counter. The controller 230 may increment the counter (or some other data indicating the number of times invalid tap/swipe inputs have been received) each time invalid tap/swipe inputs are received. In one embodiment, the controller 230 may delete at least a portion of the data stored on the non-volatile storage components 245 when the number of access attempts exceeds a threshold (e.g., if the counter exceeds a threshold). In another embodiment, the controller 230 may encrypt at least a portion of the data stored on the non-volatile storage components 245 when the number of access attempts exceeds a threshold. In some embodiments, the controller 230 may reset the counter after a period of time has passed. For example, the controller 230 may reset the counter after one minutes, five minutes, ten minutes, etc. In another example, the counter may be reset when valid tap/swipe inputs are provided by the user (e.g., when a valid password is received). In a further embodiment, the controller 230 may pause for an amount of time before tap/swipe inputs may be provided each time invalid tap/swipe inputs are received. For example, when invalid tap/swipe inputs are received, the controller 230 may not process and/or access additional tap/swipe inputs until a period of time has passed (e.g., 5 seconds, 10 seconds, etc.). In another example, the controller 230 may not process and/or access additional tap/swipe inputs until the data storage device 220 is reset (e.g., restarted, rebooted, powered off and then powered on, etc.).

In one embodiment, the controller 230 may determine an orientation and/or a position of the data storage device 220 using one or more sensors (not illustrated in FIG. 2) of the data storage device 220 (e.g., a compass/magnetometer, gyroscope, accelerometer, etc.). For example, the controller 230 may determine whether a face of data storage device 220 (e.g., whether the front face, the back face, etc.) is pointed in direction (e.g., is pointed north, south, east, west, etc.). In another example, the controller 230 may determine whether the data storage device 220 is right side up, upside down, or on its side. The controller 230 may allow access to the non-volatile storage components 245 based on the orientation/position of the data storage device 220 and/or the tap/swipe inputs received from the touch-sensitive input device 250. For example, the controller 230 may allow access to the non-volatile storage components 245 when the front face of the data storage device 220 is pointed north and when the tap/swipe inputs received from the touch-sensitive input device 240 are valid. The controller 230 may prevent access to the non-volatile storage components 245 based on the orientation/position of the data storage device 220 and/or the tap/swipe inputs received from the touch-sensitive input device 250. For example, the controller 230 may prevent access to the non-volatile storage components 245 if the tap/swipe inputs are invalid and/or if the data storage device 220 is not in a particular orientation.

In another embodiment, the controller 230 may determine a location of the data storage device 220 using one or more sensors of the data storage device 220 (e.g., a GPS sensor). For example, the controller 230 may determine the GPS coordinates (e.g., a physical location, a geographical location) of the data storage device 220. The controller 230 may allow access to the non-volatile storage components 245 based on the location of the data storage device 220 and/or the tap/swipe inputs received from the touch-sensitive input device 250. For example, the controller 230 may allow access to the non-volatile storage components 245 when the GPS coordinates indicate that the data storage device 220 is located in a user's home and when the tap/swipe inputs received from the touch-sensitive input device 240 are valid. The controller 230 may prevent access to the non-volatile storage components 245 based on the location of the data storage device 220 and/or the tap/swipe inputs received from the touch-sensitive input device 250. For example, the controller 230 may prevent access to the non-volatile storage components 245 if the tap/swipe inputs are invalid and/or if the data storage device 220 is not in a particular location.

In one embodiment, the controller 230 may determine the pressures of the tap/swipe inputs received from the touch-sensitive input device 250. For example, the controller 230 may determine the pressure of a tap input (e.g., how hard a touch object, such as a finger or stylus, tapped the touch-sensitive input device 250). In another example, the controller 230 may determine the pressure of a swipe input (e.g., how hard a touch object, such as a finger or stylus, swiped the touch-sensitive input device 250). It shall be understood that in other embodiments, the controller 230 may determine a pressure for each tap/swipe input in a set of tap/swipe inputs. The controller 230 may allow access to the non-volatile storage components 245 based on the pressures of the tap/swipe inputs and/or based on the tap/swipe inputs received from the touch-sensitive input device 250. For example, the controller 230 may allow access to the non-volatile storage components 245 when a set of tap inputs is valid and the pressures of the set of tap inputs is below a threshold (e.g., the set of tap inputs are softer taps on the touch-sensitive input device 250). In another example, the controller 230 may allow access to the non-volatile storage components 245 when a set of swipe inputs is valid and the pressures of the set of swipe inputs is above a threshold (e.g., the set of swipe inputs are harder swipes on the touch-sensitive input device 250). The controller 230 may prevent access to the non-volatile storage components 245 based on the tap/swipe inputs received from the touch-sensitive input device 250 and/or pressures of the tap/swipe inputs. For example, the controller 230 may prevent access to the non-volatile storage components 245 if the tap/swipe inputs are invalid and/or if one or more of the pressures of the tap/swipe inputs are below and/or greater than a threshold.

In one embodiment, the controller 230 may receive multiple sets of tap/swipe inputs (e.g., multiple sets of tap inputs and/or swipe inputs). The multiple sets of tap/swipe inputs may be associated with different users of the data storage device 220. For example, a first set of tap/swipe inputs may be associated with a first user and a second set of tap/swipe inputs may be associated with a second user. The controller 230 may allow (e.g., grant) the first user access to the non-volatile storage components 245 when the first set of tap/swipe inputs are valid and may allow the second user access to the non-volatile storage components 245 when the second set of tap/swipe inputs are valid. In another embodiment, the controller 230 may allow access to different portions of the non-volatile storage components 245 based on the different sets of tap/swipe inputs. For example, the controller 230 may grant access to a first portion of the non-volatile storage components 245 (e.g., a first set of files and/or folders, a first partition of the data storage device 220, etc.) when the first set of tap/swipe inputs are valid and may grant access to a second portion of the non-volatile storage components 245 (e.g., a second set of files and/or folders, a second partition of the data storage device 220, etc.) when the second set of tap/swipe inputs are valid.

In one embodiment, the controller 230 may allow users to enable and/or disable secure access (e.g., enable or disable security) to the data storage device 220 (e.g., to the non-volatile storage components 245) based on tap/swipe inputs. For example, the controller 230 may receive user input (e.g., via the network-access interface 243, via the direct-access interface 241, via the touch-sensitive input device 250) indicating that the controller 230 should determine whether tap/swipe inputs are valid before granting access to the data storage device 220. In another example, the controller may receive user input indicating that the controller 230 should grant access the data storage device 220 without using tap/swipe inputs (e.g., without determining whether tap/swipe inputs are valid). The controller 230 may also allow one or more users to set and/or change which tap/swipe inputs are valid (e.g., to indicate sequence of taps and/or swipe that are valid). For example, a user may change a first set (e.g., sequence) of tap/swipe inputs to a second set of tap/swipe inputs (e.g., may change the password or touch password). The controller 230 may also grant and/or prevent access to the data storage device 220 based on the location of the data storage device, the orientation of the data storage device, and/or the pressures of tap/swipe inputs, as discussed in more detail below.

Granting and/or preventing access to the data storage device 220 based on tap/swipe input received from the touch-sensitive input device 250 may allow the data storage device to be used with a wider variety of computing devices with different operating systems because the computing devices do not need an application (e.g., an unlocker application) to provide secure access to the data storage device 220. This may also allow the data storage device 220 to be bootable while still providing secure access to the data storage device 220. In addition, data storage device 220 may be more secure because the tap/swipe input (e.g., the password) is not transmitted to the data storage device 220 via a communication interface (e.g. via a DAS interface or a NAS interface). The tap/swipe inputs also allow the user to provide a stronger password as compared to a standard alphanumeric password.

Providing Secure Access Based on Touch Input

Figure 3A:
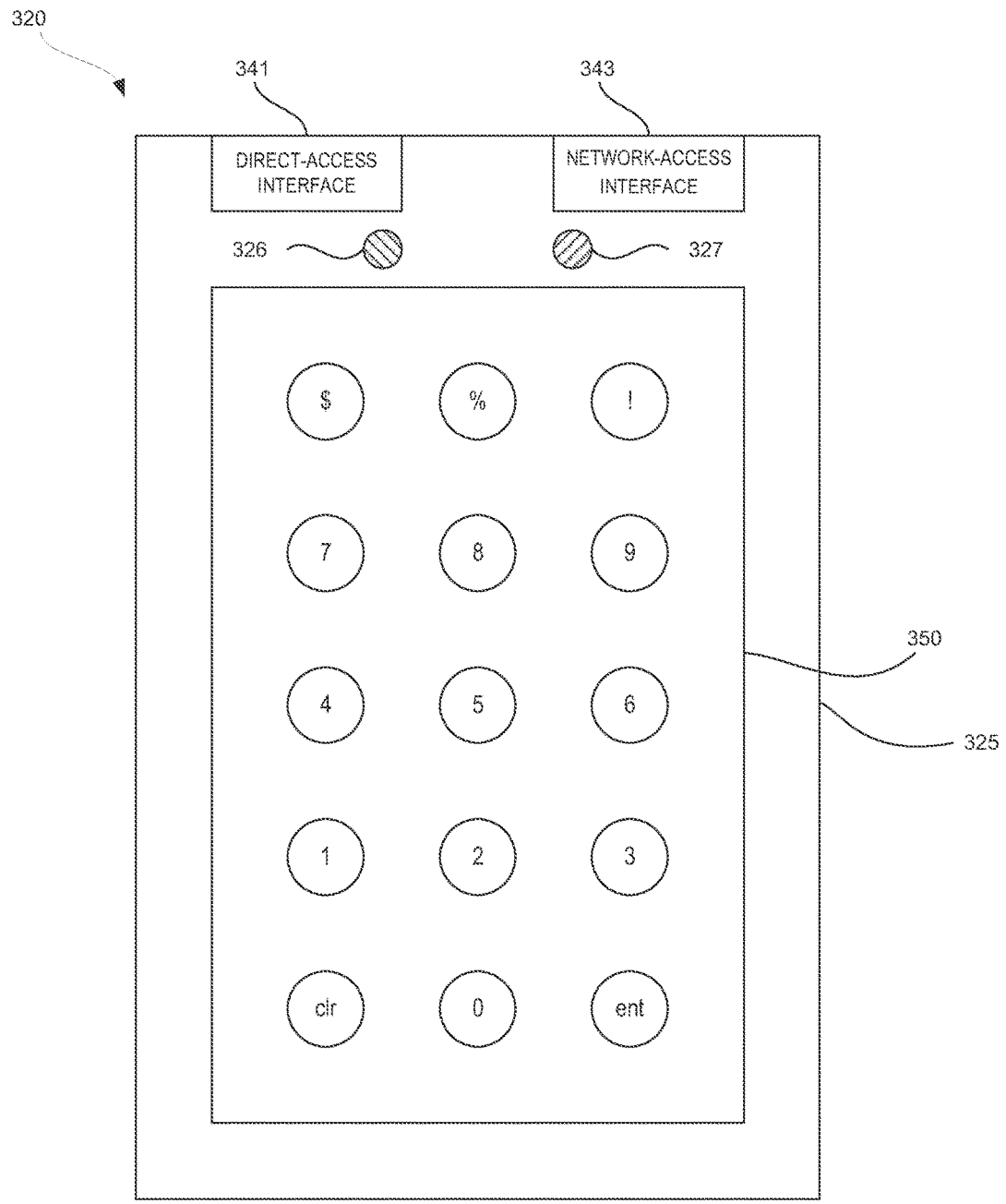
FIG. 3A is a diagram of a data storage device, according to an embodiment.

FIG. 3A is a diagram of a data storage device 320, according to an embodiment. The data storage device 320 includes a controller (not illustrated in FIG. 3A), a housing 325 (e.g., a casing), a light emitting diode (LED) 326, a LED 327, a direct-access interface 341 (e.g., USB 2.X, USB 3.X, Thunderbolt, eSATA, etc.), a network-access interface 343 (e.g., Ethernet, Wi-Fi, etc.), a touch-sensitive input device 350, and non-volatile storage components (not illustrated in FIG. 3A). The non-volatile storage components may be coupled to the controller via one or more serial bus connectors (e.g., SATA connectors, PCIe connectors, etc.). The non-volatile storage components 245 may include non-volatile magnetic media, and/or solid-state memory (e.g., NAND flash). The controller may provide overall control for the data storage device 320. In one embodiment, the data storage device 320 may be external standalone data storage devices (e.g., NAS devices/drives, DAS devices/drives, etc.). In another embodiment, the data storage device 320 may be a portable data storage device. For example, the data storage device 320 may be a portable external hard drive. In a further embodiment, data storage device 320 may receive power from a computing device (e.g., a host system) via a connection cable and the direct-access interface 341 (e.g., may not have a power source), as discussed above.

As illustrated in FIG. 3A, the touch-sensitive input device 350 is located on the housing 325 of the data storage device 320 such that the touch-sensitive input device 350 is accessible by a user (e.g., such that the user and/or touch object can touch/contact the touch-sensitive input device 350 to provide tap/swipe input). The touch-sensitive input device 350 may be a touchscreen, a touch pad, a track pad, etc. The touch-sensitive input device 350 includes buttons (e.g., fifteen circular buttons with alphanumeric characters) to facilitate user input, as discussed in more detail below. In one embodiment, the buttons may be drawn or etched onto the surface of the touch-sensitive input device 350 (e.g., may be drawn using ink). For example, the buttons may be drawn/etched into the surface of a touch pad. In another embodiment, the buttons may be displayed by the touch-sensitive input device 250. For example, the buttons may be displayed by a touchscreen (e.g., an LCD touchscreen). The buttons include numbers (e.g., 0-9), alphanumeric characters *e.g., "$," "%," "!," etc.), a clear button (e.g., "clr") and an enter button (e.g., "ent"). The numbers and alphanumeric characters may allow the user to provide a password (e.g., an alphanumeric password) using tap/swipe inputs. The clear button may allow a user to cancel tap/swipe inputs and/or restart the process for entering/providing tap/swipe inputs. The enter button may allow a user to indicate that the user is done providing tap/swipe inputs (e.g., the user is finished entering a password) and that the data storage device 320 may determine whether the tap/swipe inputs are valid. The clear and enter buttons may also be used to perform other functions, such as changing authorized taps and/or swipes (e.g., changing passwords), enabling secure access, disabling securing access, etc.

The data storage device 320 also includes LEDs 326 and 327. The LEDs 326 and 327 may be used to indicate and/or communicate information with the user of the data storage device 320. For example, the LED 327 may be a red LED that may flash when a user provides invalid tap/swipe input. In another example, the red LED may be solid (e.g., may be lit and may not blink) when the user is not allowed to provide tap/swipe input. In a further example, the LED 326 may be a green LED that may blink green when valid tap/swipe input is provided. It shall be understood that in other embodiments, any number of LEDs, colors, flashing lights, solid lights, and/or other indicators (e.g., other types of visual indicators and/or haptic feedback) may be used to indicate various information to the user. In one embodiment, the touch-sensitive input device 350 may not include any buttons, markings, etc. For example, the touch-sensitive input device 350 may be blank surface or blank screen. The user may provide tap/swipe inputs by tapping and swiping locations on the blank surface/screen.

Figure 3B:
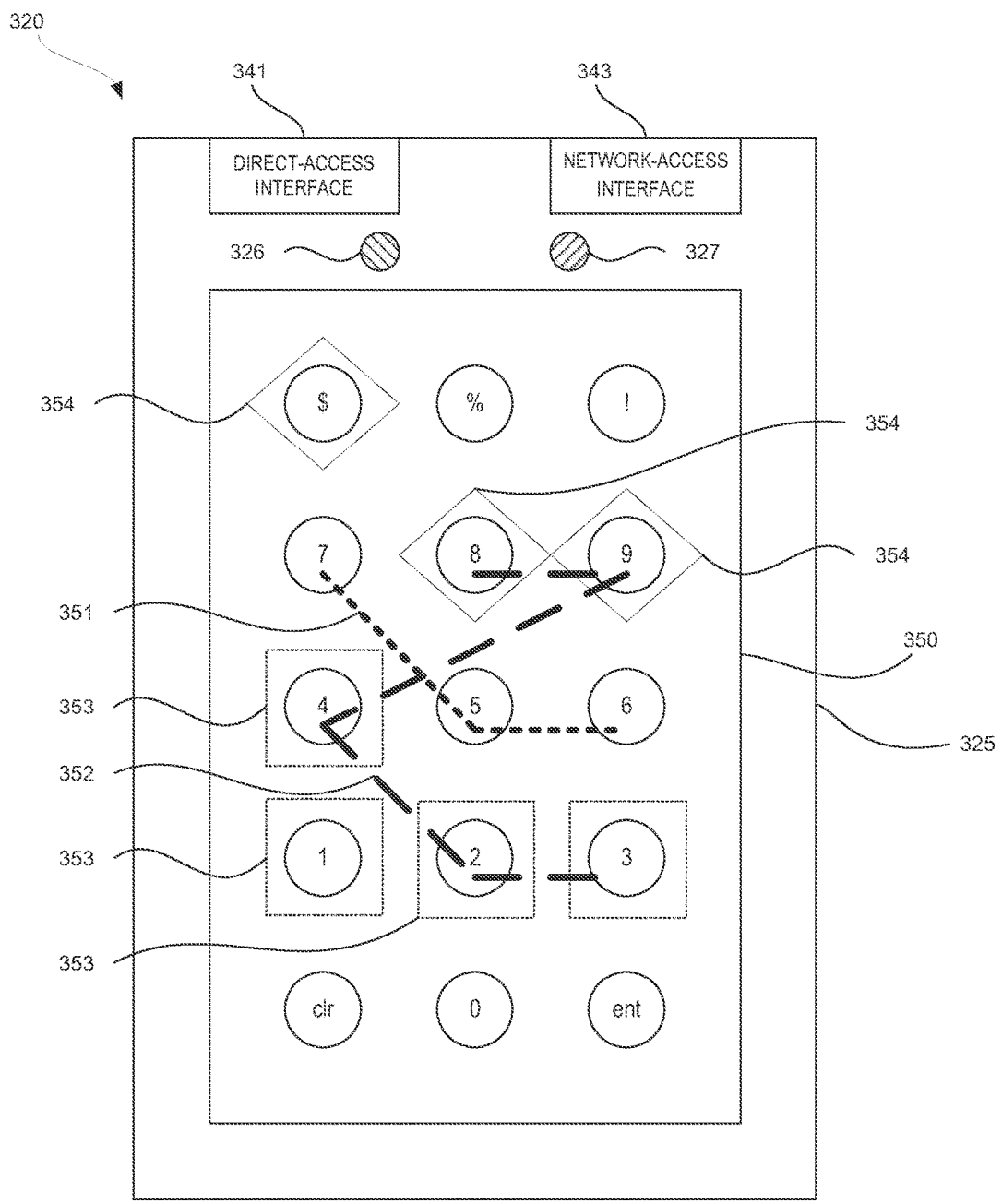
FIG. 3B is a diagram of a data storage device, according to an embodiment.

FIG. 3B is a diagram of a data storage device 320, according to an embodiment. As discussed above, a user of the data storage device 320 may provide tap/swipe inputs to access data stored on the data storage device 320 (e.g., to access the non-volatile storage components). The data storage device 320 (e.g., the controller of the data storage device 320) may determine whether the tap/swipe inputs are valid. The data storage device 320 may grant access to the non-volatile storage components (e.g., a portion of the non-volatile storage components) when the tap/swipe inputs are valid. The data storage device may also prevent (e.g., deny) access to the non-volatile storage components (e.g., a portion of the non-volatile storage components) when the tap/swipe inputs are not valid (e.g., are invalid or incorrect). As illustrated in FIG. 3B, different tap/swipe inputs may be provided by one or more users. For example, a user may provide swipe input 352 by swiping through the buttons "8," "9," "4," "2," and "3" of the touch-sensitive input device 350 (in the aforementioned sequence) as illustrated by the dashed line in FIG. 3B. In another example, a user may provide tap inputs 354 by tapping the buttons "$," "9," and "8" (in the aforementioned sequence) as illustrated by the dotted diamonds in FIG. 3B. In a further example, a user may provide tap inputs 353 by tapping the buttons "1," "4," "3," and "2" (in the aforementioned sequence) as illustrated by the dotted squares in FIG. 3B. In yet another example, a user may provide swipe input 351 by swiping through the buttons "6," "5," and "7" of the touch-sensitive input device 350 (in the aforementioned sequence) as illustrated by the dotted line in FIG. 3B.

In one embodiment, the data storage device 320 may determine whether tap/swipe inputs are valid by determining whether one or more swipe inputs match one or more swipe patterns previously provided by a user when the user configured the data storage device 320 to provide secure access to the data stored on the data storage device 320. The one or more swipe patterns previously provided by the user may be referred to as one or more authorized swipe patterns. In one embodiment, an authorized swipe pattern may be a swipe pattern that a swipe input received from the touch-sensitive input device 350 is compared against. The data storage device 320 (e.g., the controller) may determine whether the swipe input 352 matches an authorized swipe pattern. For example, the data storage device 320 may determine whether the dashed line (representing swipe input 352) matches an authorized swipe pattern. In another embodiment, the data storage device 320 may also determine whether swipe input 352 is located at a location (e.g., a particular location) of the touch-sensitive input device 350. For example, the data storage device 320 may determine whether the swipe input 352 starts at the location (or approximate location) of button "8" and ends at the location (or approximate location) of button "3." It shall be understood that various algorithms, functions, methods may be used to determine whether a swipe input matches an authorized swipe pattern. For example various object and/or pattern matching algorithms may be used. In another example, the swipe input and the authorized swipe pattern may be divided into a set of curves/lines and the curve/lines of the swipe input and the authorized swipe patter may be compared. In one embodiment, the matching swipe input may not be an exact match for the authorized swipe pattern. For example, the data storage device 320 may still determine that the swipe input is valid (e.g., matches the authorized swipe pattern) if the swipe input differs within an acceptable tolerance from the authorized swipe pattern.

In one embodiment, the data storage device 320 may determine whether tap/swipe inputs are valid by determining whether one or more tap inputs match one or more taps previously provided by a user when the user configured the data storage device 320 to provide secure access to the data stored on the data storage device 320. The one or more taps previously provided by the user may be referred to as one or more authorized taps. In one embodiment, an authorized tap may be a tap that a tap input received from the touch-sensitive input device 350 is compared against. The data storage device 320 (e.g., the controller) may determine whether the tap inputs 354 match a set of authorized taps. For example, the data storage device 320 may determine whether tap inputs 354 (indicated by the dotted diamonds) are located at the locations (or approximate locations) of the buttons "$," "9," and "8." The data storage device 320 may also determine whether the tap inputs 354 are provided in the same order as the set of authorized taps (e.g., in the order "$," "9," and "8"). It shall be understood that various algorithms, functions, and methods may be used. For example, the data storage device may detect the location of the center (e.g., the centroid) of a tap input (e.g., X-Y coordinates) and may determine whether the location of the center is within a range of the location of the center of an authorized tap.

The data storage device 320 may determine that tap/swipe inputs are valid when the tap/swipe inputs input match one or more authorized swipe patterns and/or one or more authorized taps. For example, the data storage device may grant access if the swipe input 351 matches an authorized swipe and the tap inputs 353 match a set of authorized taps. In another example, the data storage device may grant access if the tap inputs 354 match a set of authorized taps and the swipe input 352 matches an authorized swipe. The data storage device may grant access to the non-volatile storage components when the tap/swipe inputs are valid, as discussed in more detail below. The data storage device 320 may determine that tap/swipe inputs are not valid (e.g., are invalid, incorrect, etc.) when the tap/swipe inputs input do not match one or more authorized swipe patterns and/or one or more authorized taps. The data storage device may prevent access to the non-volatile storage components when the tap/swipe inputs are not valid, as discussed in more detail below.

In one embodiment, the data storage device 320 may determine whether tap/swipe inputs are valid by determining whether sets of characters associated with the tap/swipe inputs match sets of characters previously provided by a user when the user configured the data storage device 320 to provide secure access to the data stored on the data storage device 320. The sets of characters previously provided by the user may by referred to as authorized sets of characters. The user may provide the sets of authorized characters by tapping and/or swiping through the buttons of the touch-sensitive input device 350. For example, the user may tap the buttons "1," "2," and "3" in the aforementioned order to generate an authorized set of characters (e.g., [1, 2, 3]). In another example, the user may swipe through the buttons "9," "5," and "1" to generate an authorized set of characters (e.g., [9, 5, 1]). As discussed above, a user may provide tap inputs and/or swipe inputs (e.g., tap/swipe inputs) using the touch-sensitive input device 350. The data storage device 320 (e.g., the controller) may associate a set of characters with a set of tap inputs and/or a swipe input. For example, a user may provide tap inputs 354 by tapping the buttons "$," "9," and "8" (in the aforementioned sequence), as discussed above. The data storage device 320 may determine that the set of characters [$, 9, 8] is associated with the tap inputs 354. In another example, the user may provide swipe input 351 by swiping through the buttons "6," "5," and "7"

(in the aforementioned sequence), as discussed above. The data storage device 320 may determine that the set of characters [6, 5, 7] is associated with the swipe input 351.

The data storage device 320 may determine that tap/swipe inputs are valid when the set of characters associated with the tap/swipe inputs input match one or more authorized set of characters. For example, the data storage device 320 may determine that swipe input 351 is valid when the set of characters associated with the swipe input 351 (e.g., [6, 5, 7]) matches an authorized set of characters (e.g., when the authorized set of characters is [6, 5, 7]). The data storage device may grant access to the non-volatile storage components when the tap/swipe inputs are valid, as discussed in more detail below. The data storage device 320 may determine that tap/swipe inputs are not valid (e.g., invalid, incorrect, etc.) when the set of characters associated with the tap/swipe inputs input do not match one or more authorized set of characters. The data storage device may prevent access to the non-volatile storage components when the tap/swipe inputs are not valid, as discussed in more detail below.

In one embodiment, the data storage device 320 may determine whether tap/swipe inputs are valid based on the order in which the tap/swipe inputs are provided. For example, the data storage device 320 may determine that the tap/swipe inputs are valid if the swipe input 351 is received first and the tap inputs 354 are received second. The data storage device 320 may determine that the tap/swipe inputs are not valid if the tap inputs 354 are received first and swipe input 351 is received second. In another embodiment, different users may provide different tap/swipe inputs (e.g., passwords). For example, the first user may provide tap inputs 354 and swipe input 351, and a second user may provide swipe input 352 and tap inputs 353.

In one embodiment, the data storage device 320 (e.g., the controller) may allow access to the non-volatile memory when the tap/swipe inputs are valid by decrypting at least a portion of the non-volatile memory. The data storage device 320 may decrypt (e.g., unwrap) key data based on the tap/swipe inputs provided by the user. For example, the data storage device 320 may determine sets of characters that associated with the tap/swipe inputs (as discussed above) and may decrypt the key data using the sets of characters. The key data may be text, alphanumeric characters, and/or other data that may be used to determine whether the tap/swipe inputs are valid. The key data may also be referred to as a magic number. If the data storage device 320 is able to decrypt the key data (e.g., able to properly decrypt the key data or decrypt the key data with no errors), then valid tap/swipe inputs were received from the user. The data storage device 320 may decrypt (e.g., unwrap) an encryption key using the key data and may use the encryption key to decrypt data stored on the non-volatile storage components of the data storage device. For example, the data stored in the non-volatile storage components of the data storage device 320 may be encrypted using the encryption key (e.g., the data stored in the non-volatile storage components may be encrypted using an encryption algorithm/function and the encryption key). The data storage device 320 may protect the encryption key from unauthorized access by encrypting the encryption key using the key data (e.g., the encryption key may be encrypted using an encryption algorithm/function and the key data). This may allow the encryption key to remain encrypted when the non-volatile storage components are not being accessed. When valid tap/swipe inputs are received from the user via the touch-sensitive input device 350, the data storage device may obtain the key data (e.g., may decrypt the key data), decrypt the encryption key using the key data, and decrypt the data stored on the non-volatile storage components using the encryption key. The data storage device 320 may also encrypt data to be stored on the non-volatile storage components using the encryption key. For example, the data storage device 320 may receive new data (e.g., a new file) to store on the non-volatile storage components and may encrypt the new data using an encryption function/algorithm and the encryption key.

As discussed above, the data storage device 320 may also allow access to the non-volatile storage components based on a location of the data storage device 320, an orientation of the data storage device, and/or the pressures of the tap/swipe inputs. For example, the data storage device 320 may allow access to the non-volatile storage components when the tap/swipe inputs are valid and when the data storage device is located in a specific location (e.g., an authorized location such as the user's home or workplace). The data storage device may decrypt the key data using the tap/swipe inputs (as discussed above) and using the GPS coordinates (e.g., the location) of the data storage device 320. In another example, the data storage device 320 may allow access to the non-volatile storage components when the tap/swipe inputs are valid and when the data storage device 320 is in a particular orientation (e.g., the front of the data storage device 320 is pointed north). The data storage device may decrypt the key data using the tap/swipe inputs (as discussed above) and using a value (e.g., an alphanumeric value) associated with the orientation of the data storage device 320 (e.g., the direction north may be associated with the value "1," the direction south may be associated with the value "2," etc.). In a further example, the data storage device 320 may allow access to the non-volatile storage components when the tap/swipe inputs are valid and when the pressures of the tap/swipe inputs are below and/or above threshold pressures (e.g., when the pressure of a tap/swipe input matches a threshold pressure, is above a threshold pressure, is lower than a threshold pressure, etc.). The data storage device may decrypt the key data using the tap/swipe inputs (as discussed above) and using values (e.g., alphanumeric values) associated with pressures of the tap/swipe inputs (e.g., a number or other value may be used to represent the pressure of each tap/swipe input). The data storage device 320 may decrypt an encryption key using the key data and may decrypt data stored on the non-access storage components using the encryption key. It shall be understood that in other embodiments, the data storage device 320 may use any combination of the tap/swipe inputs, the location of the data storage device 320, the orientation of the data storage device 320, and the pressures of the tap/swipe inputs to determine whether to allow and/or prevent access to the non-volatile storage components.

In another embodiment, the data storage device 320 may allow access to the non-volatile memory when the tap/swipe inputs are valid by allowing data to be communicated via the direct-access interface 341 and/or the network-access interface 343. For example, the data storage device 320 may allow data to be written to and/or read from the non-volatile storage components via the direct-access interface 341 and/or the network-access interface 343 when the tap/swipe inputs are valid.

As discussed above, the data storage device 420 (e.g., the controller of the data storage device 420) may prevent access to the data storage device (e.g., prevent access to the non-volatile storage components) when one or more tap inputs and/or one or more swipe inputs are not valid. For example, the controller may refrain from decrypting encrypted data stored on the non-volatile storage components (e.g., may not decrypt the encrypted data). In another example, the controller may not allow data to be communicated via the network-access interface 443 and/or the direct-access interface 441. For example, the controller may now not allow data to be written to and/or read from the non-volatile storage components via the direct-access interface 341 and/or the network-access interface 343.

Figure 4A:
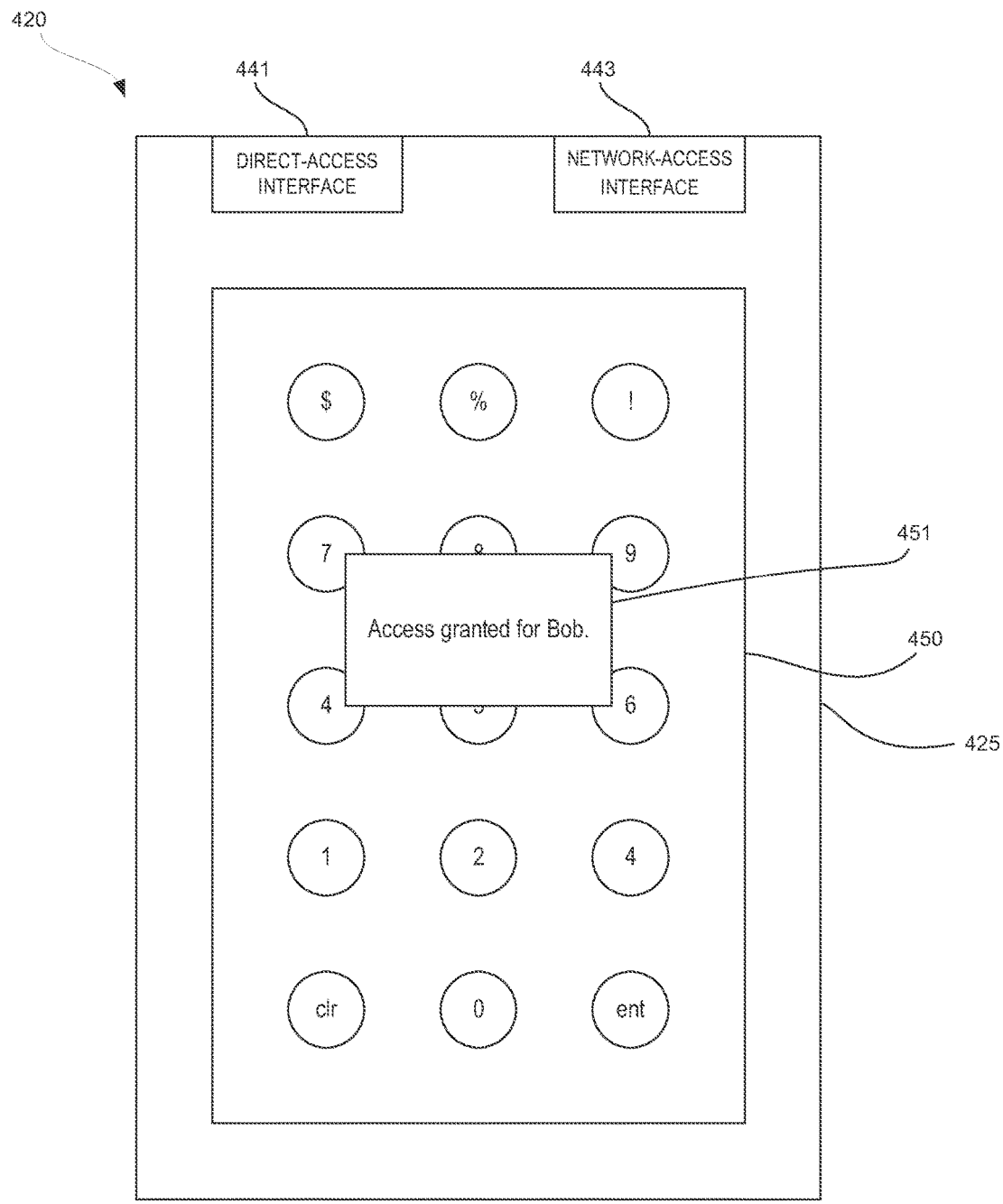
FIG. 4A is a diagram of a data storage device, according to an embodiment.

In one embodiment, a swipe input may be considered different from a tap input even though the swipe input and the tap input may be located at the same buttons. For example, a swipe input that goes from the button "7" to the button "8" and to the button "9" may be different from three tap inputs at the button "7,", the button "8," and the button "9." In other embodiments, a swipe input may be considered the same as a tap input if the swipe input and the tap input may be located at the same buttons FIG. 4A is a diagram of a data storage device 420, according to an embodiment. As discussed above, the data storage device 420 includes a controller (not illustrated in FIG. 4A), a housing 425, a direct-access interface 441 (e.g., USB 2.X, USB 3.X, Thunderbolt, eSATA, etc.), a network-access interface 443 (e.g., Ethernet, Wi-Fi, etc.), a touch-sensitive input device 450 (e.g., a touchscreen, a touch pad, a track pad, etc.), and non-volatile storage components (e.g., magnetic and/or solid state media, not illustrated in FIG. 4B). The controller may provide overall control for the data storage device 420. In one embodiment, the data storage device 420 may be external standalone data and/or a portable data storage device. In another embodiment, data storage device 420 may receive power from a computing device (e.g., a host system) via a connection cable and the direct-access interface 441, as discussed above.

As discussed above, a user of the data storage device 420 may provide tap/swipe inputs to access data stored on the data storage device 420 (e.g., to access the non-volatile storage components). Also as discussed above, the data storage device 420 (e.g., the controller of the data storage device 420) may determine whether the tap/swipe inputs are valid. The data storage device 420 may grant access to the non-volatile storage components (e.g., a portion of the non-volatile storage components) when the tap/swipe inputs are valid. In one embodiment, the data storage device 420 may display the message 451 on the touch-sensitive input device 450 when the data storage device 420 grants access to the non-volatile storage components of the data storage device. As illustrated in FIG. 4A, the message 451 includes the text "Access granted for Bob" to indicate that the user named Bob has been allowed to access the non-volatile storage components (e.g., data stored on the non-volatile storage components).

Figure 4B:
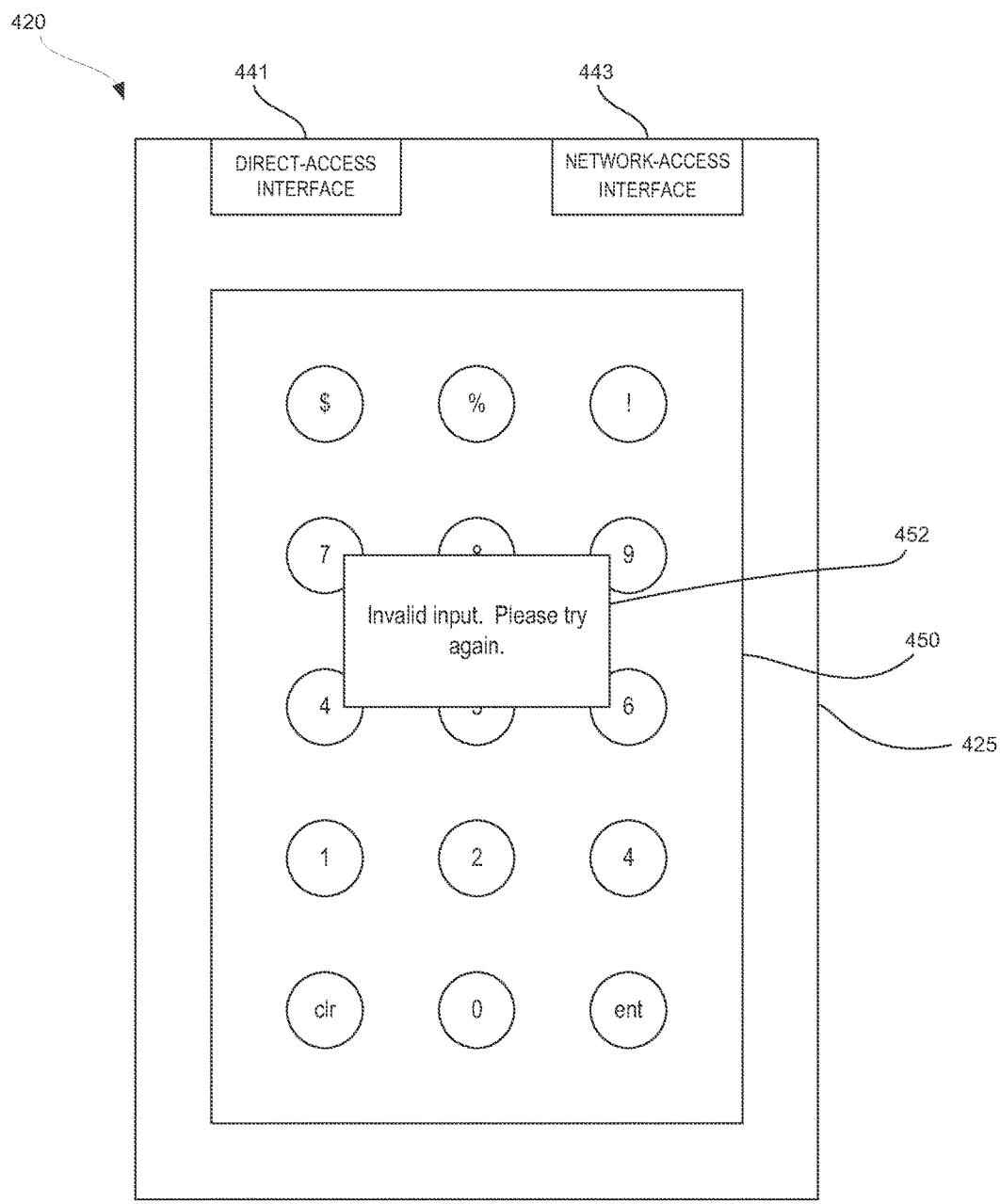
FIG. 4B is a diagram of a data storage device, according to an embodiment.

FIG. 4B is a diagram of a data storage device 420, according to an embodiment. As discussed above, a user of the data storage device 420 may provide tap/swipe inputs to access data stored on the data storage device 420 (e.g., to access the non-volatile storage components). Also as discussed above, the data storage device 420 (e.g., the controller of the data storage device 420) may determine whether the tap/swipe inputs are valid and may prevent (e.g., deny) access to the non-volatile storage components (e.g., a portion of the non-volatile storage components) when the tap/swipe inputs are invalid. In one embodiment, the data storage device 420 may display the message 452 on the touch-sensitive input device 450 when the data storage device 420 prevents access to the non-volatile storage components of the data storage device. As illustrated in FIG. 4B, the message 452 includes the text "Invalid Input. Please try again." to indicate that one or more tap inputs and/or swipe inputs provided are not valid. As discussed above, the data storage device may refrain from decrypting encrypted data stored on the non-volatile storage components and/or may not allow data to be communicated via the network-access interface 443 and/or the direct-access interface 441.

It shall be understood that the messages 451 and 452 illustrated in FIGS. 4A and 4B are merely examples of the types of messages that may be displayed/presented by the touch-sensitive input device 450. In other embodiments, different messages may be displayed/presented by the touch-sensitive input device 450. For example, the touch-sensitive input device 450 may display/present a message to indicate that an authorized tap/swipe has been changed (e.g., a password has been changed). In another example, the touch-sensitive input device 450 may display/present a message to indicate that secure access is enabled for the data storage device 420 (e.g., that tap/swipe inputs will be used to determine whether to grant/prevent access). In a further example, the touch-sensitive input device 450 may display/ present a message to indicate that secure access is disabled for the data storage device 420 (e.g., that tap/swipe inputs will not be used to determine whether to grant/prevent access).

Figure 5:
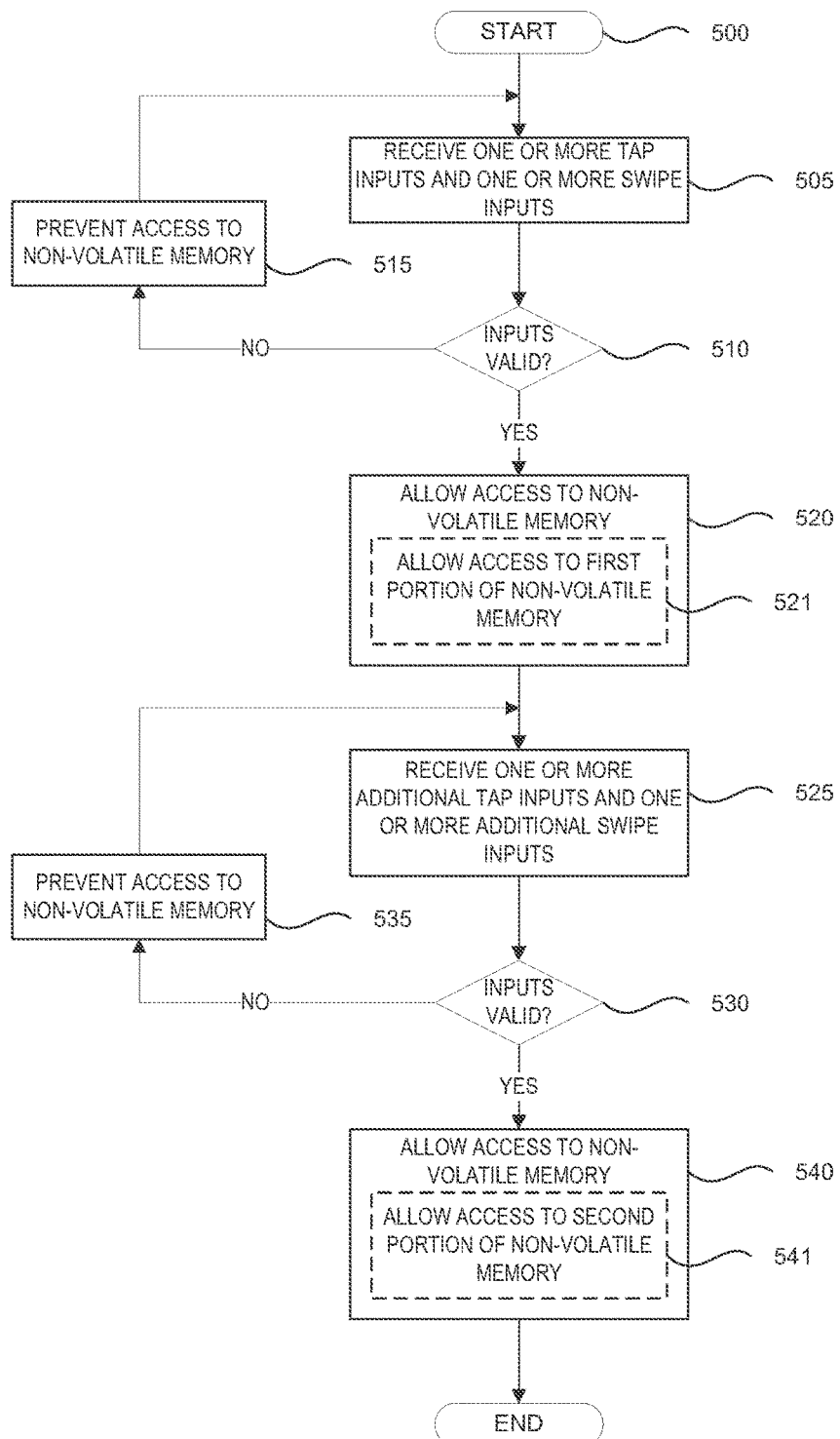
FIG. 5 is a flow diagram illustrating a process for providing secure access to a data storage device, according to an embodiment.

FIG. 5 is a flow diagram illustrating a process 500 for providing secure access to a data storage device, according to an embodiment. The process 500 may be performed by a controller and/or a data storage device, as illustrated and discussed above in conjunction with FIGS. 1-4B. The controller may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 receives one or more tap inputs and one or more swipe inputs. A first user may provide the one or more tap inputs and the one or more swipe inputs using a touch-sensitive input device, as discussed above. For example, the user may tap and/or swipe through buttons to provide the one or more tap inputs and the one or more swipe inputs. The user may also use a clear button to cancel tap/swipe inputs and/or use an enter button to indicate that the user is done providing tap/swipe inputs, as discussed above. At block 510, the process 500 determines whether the one or more tap inputs and one or more swipe inputs are valid. For example, the process 500 may determine whether a swipe input matches an authorized swipe pattern, as discussed above. In another example, the process 500 may determine whether a set of characters associated with the swipe input matches an authorized set of characters, as discussed above. If one or more of the tap inputs and/or swipe inputs are invalid, the process 500 may prevent access to the non-volatile memory of the data storage device at block 515. For example, the process 500 may refrain from decrypting data in the non-volatile memory or may prevent data from being communicated via a direct-access interface and/or a network-access interface.

If the one or more tap inputs and the one or more swipe inputs are valid, the process 500 may allow access to the non-volatile memory at block 520. For example, the process 500 may decrypt key data based on the one or more tap inputs and the one or more swipe inputs (as discussed above) and may decrypt an encryption key based on the key data. The process 500 may also decrypt data stored on the non-volatile memory based on the encryption key. At block 521, the process 500 may optionally allow access to a first portion of the non-volatile memory (e.g., to a first partition, a first set of file/folders, etc.). For example, different users may use the data storage device. The process 500 may allow different users access to different portions of the non-volatile memory based on different tap/swipe inputs (as discussed above).

The process 500 may optionally receive one or more additional tap inputs and one or more additional swipe inputs at block 525. A second user may provide the one or more tap inputs and the one or more swipe inputs using a touch-sensitive input device, as discussed above. At block 530, the process 500 may optionally determine whether the one or more additional tap inputs and one or more additional swipe inputs are valid, as discussed above. If one or more of the tap inputs and/or swipe inputs are invalid, the process 500 may optionally prevent access to the non-volatile memory of the data storage device at block 535, as discussed above. If the one or more tap inputs and the one or more swipe inputs are valid, the process 500 may optionally allow access to the non-volatile memory at block 540. At block 541, the process 500 may optionally allow access to a second portion of the non-volatile memory (e.g., to a second partition and/or additional partitions, a second set of file/ folders, etc.).

Figures 6, 7:
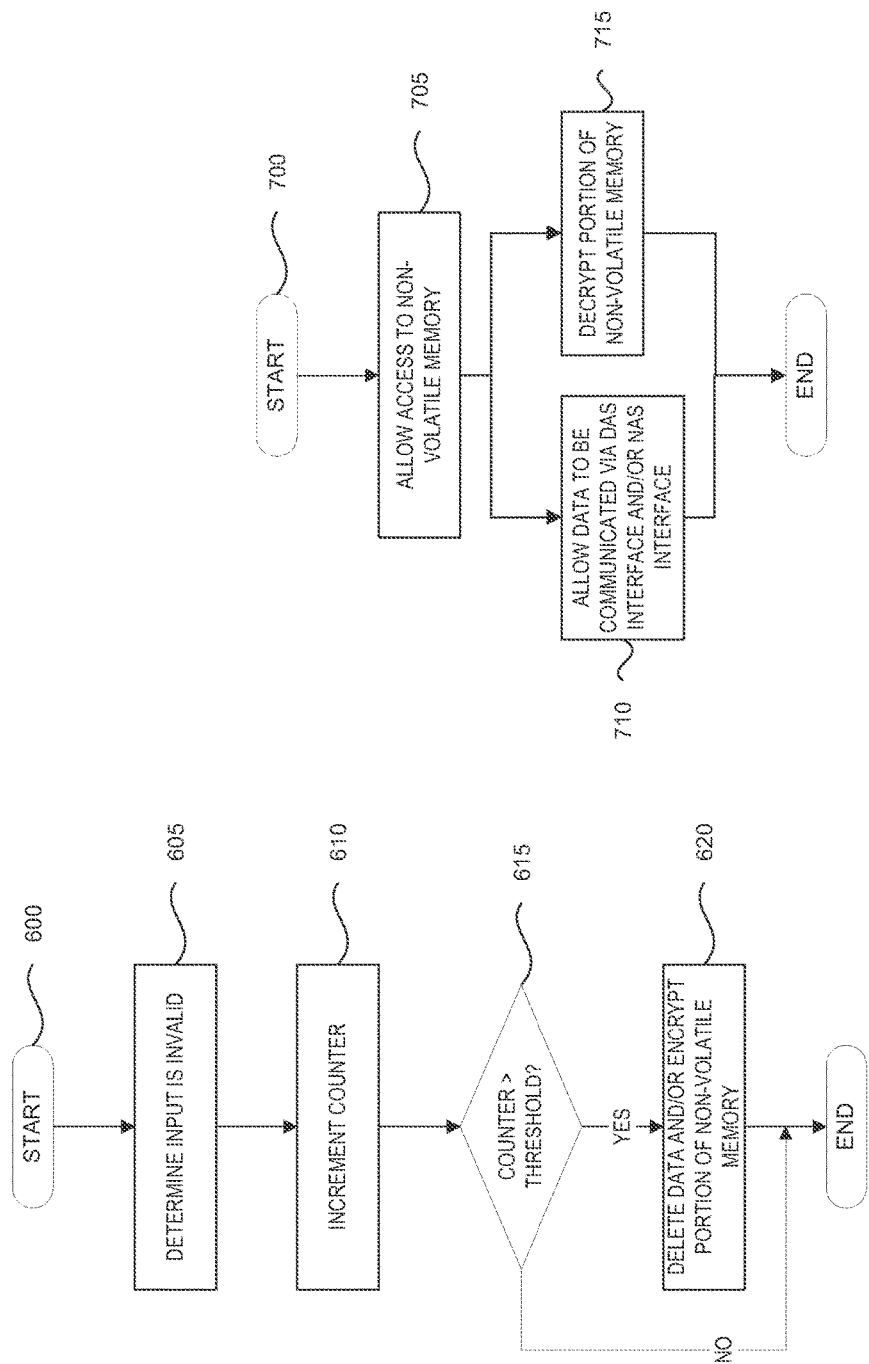
FIG. 6 is a flow diagram illustrating a process for providing secure access to a data storage device, according to an embodiment.
FIG. 7 is a flow diagram illustrating a process for providing secure access to a data storage device, according to an embodiment.

FIG. 6 is a flow diagram illustrating a process 600 for providing secure access to a data storage device, according to an embodiment. The process 600 may be performed by a controller and/or a data storage device, as illustrated and discussed above in conjunction with FIGS. 1-4B. The controller may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 where the process 600 determines whether one or more tap inputs and/or one or more swipe inputs are invalid. The process 600 increments a counter at block 610. The counter may be used to track the number of times invalid tap/swipe inputs have been received, as discussed above. At block 615, the process 600 determines whether the counter is greater than a threshold. If the counter is greater than a threshold, the process 600 may delete data stored on the non-volatile memory and/or may encrypt a portion of the non-volatile memory. For example, the process 600 may write random data in/over locations in a non-volatile storage memory multiple times to delete the data stored in the locations. In another example, the process 600 may encrypt the data stored in locations of the non-volatile memory with random encryption keys and may delete the random encryption keys to prevent the data stored in the locations from being accessed. This may allow the process 600 to protect the data stored on the non-volatile memory against unauthorized access. If the counter is not greater than the threshold, the process 600 ends. As discussed above, the counter may be periodically reset (e.g., may be set to 0) and/or may be reset when valid tap/swipe inputs are provided by a user.

FIG. 7 is a flow diagram illustrating a process 700 for providing secure access to a data storage device, according to an embodiment. The process 700 may be performed by a controller and/or a data storage device, as illustrated and discussed above in conjunction with FIGS. 1-4B. The controller may be processing logic that includes hardware (e.g., circuitry, dedicated logic, programmable logic, microcode, etc.), software (e.g., instructions run on a processor to perform hardware simulation), firmware, or a combination thereof.

The process 700 begins at block 705 where the process 700 allows access to non-volatile memory of the data storage device. For example, the process 700 may allow access to the non-volatile memory after determining that tap/swipe inputs provided by a user are valid, as discussed above. At block 710, the process 700 may allow data to be communicated via a network-access (NAS) interface and/or via a direct-access (DAS) interface. For example, the process 700 may allow data to be written to and/or read from the non-volatile memory via the DAS interface. At block 715, the process 700 may decrypt at least a portion of the non-volatile memory. For example, the process 700 may decrypt key data (e.g., a magic number) based on tap/swipe input (as discussed above). The process 700 may use the key data to decrypt an encryption key and may use the encryption key to decrypt the portion of the non-volatile memory.

In one embodiment, the process 700 may perform both blocks 710 and 715 (e.g., may decryption a portion of the non-volatile memory and may allow data to be accessed via a DAS interface and/or NAS interface). In another embodiment, the process 700 may perform block 710 but may not perform block 715. In a further embodiment, the process 700 may perform block 715 but may not perform block 710.

Figure 8:
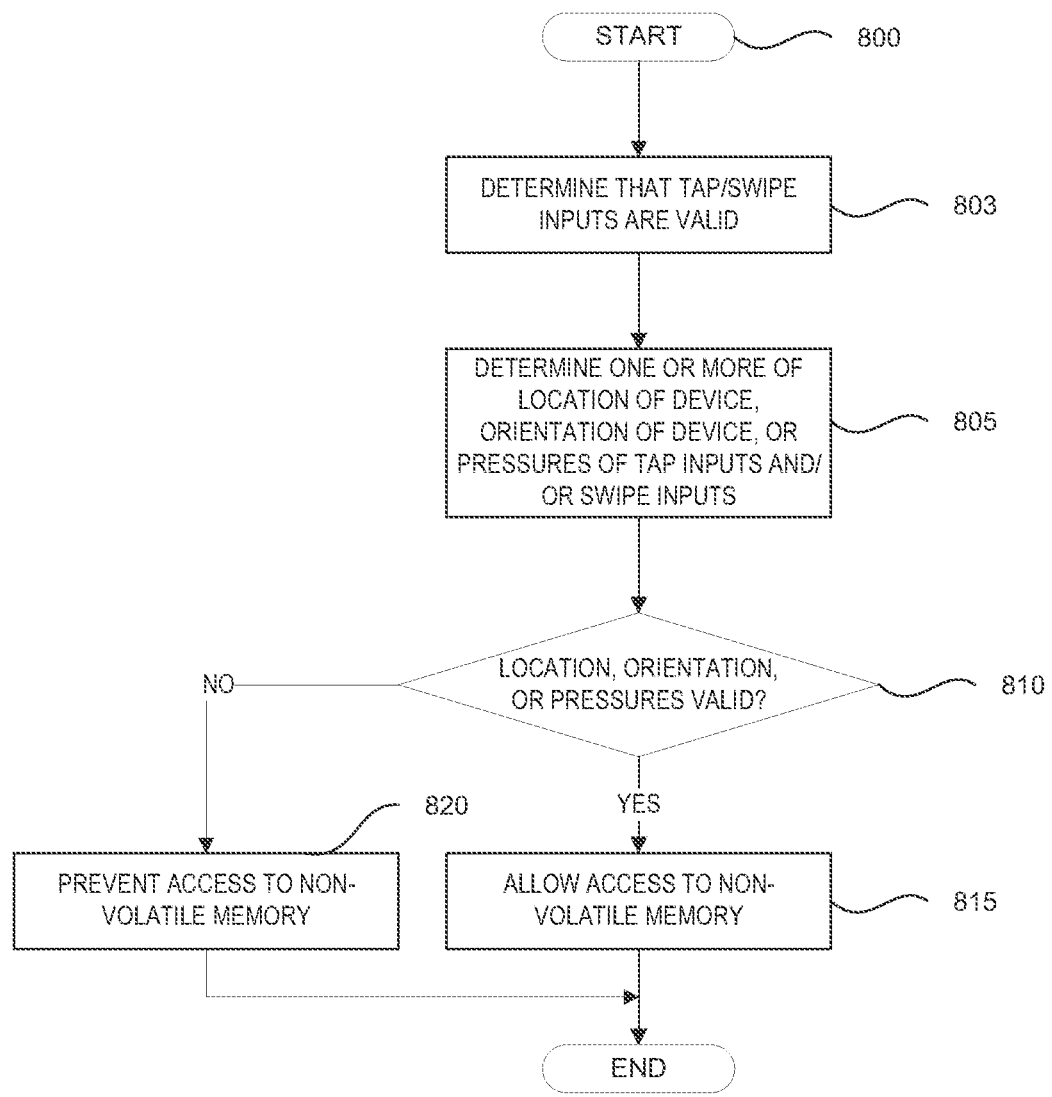
FIG. 8 is a flow diagram illustrating a process for providing secure access to a data storage device, according to an embodiment.

FIG. 8 is a flow diagram illustrating a process 800 for providing secure access to a data storage device, according to an embodiment. The process 800 may be performed by a controller and/or a data storage device, as illustrated and discussed above in conjunction with FIGS. 1-4B. The controller may be processing logic that includes hardware (e.g., circuitry, dedicated logic, programmable logic, microcode, etc.), software (e.g., instructions run on a processor to perform hardware simulation), firmware, or a combination thereof.

The process 800 begins at block 803 where the process 800 determines that tap/swipe inputs provided by a user are valid, as discussed above. At block 805, the process 800 may determine one or more of the location of the data storage device (e.g., GPS coordinates), the orientation of the data storage device (e.g., the front of the data storage device is pointed south), and pressures of the tap/swipe inputs, as discussed above. At block 810, the process determines whether the location of the data storage device, the orientation of the data storage device, and/or the pressures of the tap/swipe inputs are valid, as discussed above. If the location of the data storage device, the orientation of the data storage device, and/or the pressures of the tap/swipe inputs are valid, the process 800 may allow access to the non-volatile memory 815 of the data storage device, as discussed above. If one or more of the location of the data storage device, the orientation of the data storage device, and/or the pressures of the tap/swipe inputs are not valid, the process 800 may prevent access to the non-volatile memory of the data storage device at block 820.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A portable data storage device configured to connect to a host system separate from the portable data storage device, the portable data storage device comprising:
   a touch-sensitive input device;
   a non-volatile memory; and
   a controller coupled to the non-volatile memory, the controller configured to:
      receive one or more tap inputs and one or more swipe inputs from the touch-sensitive input device;
      determine pressure values for the one or more tap inputs and the one or more swipe inputs;
      during entry of the one or more tap inputs and the one or more swipe inputs, determine an orientation, including a facing direction and a device orientation, of the portable data storage device;

determine a first alphanumeric value represented by the one or more tap inputs and the one or more swipe inputs;

convert the orientation into a second alphanumeric value, where different orientations of the portable data storage device represent different alphanumeric values;

convert the pressure values into a third alphanumeric value, where different pressure levels represent different alphanumeric values;

determine a decryption value based at least partly on the first alphanumeric value, the second alphanumeric value, and the third alphanumeric value;

determine whether the one or more tap inputs and the one or more swipe inputs are valid;

using the decryption value, decrypt key data for accessing the non-volatile memory; and in response to determining that the one or more tap inputs and the one or more swipe inputs are valid, utilize the key data to allow the host system access to the non-volatile memory.

2. The portable data storage device of claim 1, wherein the controller is configured to determine whether the one or more tap inputs and the one or more swipe inputs are valid by:

determining whether the one or more tap inputs are located at one or more particular locations of the touch-sensitive input device; and determining whether the swipe inputs match one or more swipe patterns.

3. The portable data storage device of claim 1, wherein:
the one or more tap inputs are associated with a first set of characters;
the one or more swipe inputs are associated with a second set of characters; and
the controller is configured to determine whether the one or more tap inputs and the one or more swipe inputs are valid by:
determining whether the first set of characters matches a third set of characters; and
determining whether the second set of characters matches a fourth set of characters.

4. The portable data storage device of claim 1, wherein the device orientation comprises at least one of right side up, upside down, and on its side.

5. The portable data storage device of claim 1, wherein the controller is further configured to:
determine a location of the portable data storage device; and
allow the host system access to the non-volatile memory based on the location of the portable data storage device.

6. The portable data storage device of claim 1, wherein the controller is further configured to:
receive an additional one or more tap inputs and an additional one or more swipe inputs from the touch-sensitive input device, wherein:
the one or more tap inputs and the one or more swipe inputs are associated with a first user; and
the additional one or more tap inputs and the additional one or more swipe inputs are associated with a second user;
determine whether the additional one or more tap inputs and the additional one or more swipe inputs are valid; and allow the host system access to the non-volatile memory in response to determining that the additional one or more tap inputs and the additional one or more swipe inputs are valid.

7. The portable data storage device of claim 6, wherein the controller is further configured to:
allow the host system access to a first portion of the non-volatile memory in response to determining that the one or more tap inputs and the one or more swipe inputs are valid; and
allow the host system access to a second portion of the non-volatile memory in response to determining that the additional one or more tap inputs and the additional one or more swipe inputs are valid.

8. The portable data storage device of claim 1, wherein the controller is configured to allow the host system access to the non-volatile memory by:
decrypting at least a portion of the non-volatile memory.

9. The portable data storage device of claim 1, wherein the controller is configured to allow the host system access to the non-volatile memory by:
allowing data to be communicated via a direct-attached storage (DAS) interface or a network-attached storage (NAS) interface.

10. The portable data storage device of claim 1, wherein the controller is further configured to:
prevent access by the host system to the non-volatile memory in response to determining that the one or more tap inputs are invalid or the one or more swipe inputs are invalid.

11. The portable data storage device of claim 1, wherein the controller is further configured to:
determine a number of access attempts in response to determining that the one or more tap inputs are invalid or the one or more swipe inputs are invalid; and
delete data stored on the non-volatile memory in response to determining that the number of access attempts exceeds a threshold.

12. The portable data storage device of claim 1, wherein the controller is further configured to:
determine a number of access attempts in response to determining that the one or more tap inputs are invalid or the one or more swipe inputs are invalid; and
encrypt at least a portion of the non-volatile memory in response to determining that the number of access attempts exceeds a threshold.

13. The portable data storage device of claim 1, wherein:
the portable data storage device lacks a power source; and
the portable data storage device is configured to receive power from the host system.

14. The portable data storage device of claim 1, wherein utilizing the key data to allow the host system access to the non-volatile memory comprises:
using the key data, decrypting an encryption key stored on the non-volatile memory; and
using the encryption key, decrypting encrypted data on the non-volatile memory.

15. A method for providing a host system with access to a data storage device, the method comprising:
receiving one or more tap inputs and one or more swipe inputs from a touch-sensitive input device of the data storage device;
determining pressure values for the one or more tap inputs and the one or more swipe inputs;
determining whether the one or more tap inputs and the one or more swipe inputs are valid;

during entry of the one or more tap inputs and the one or more swipe inputs, determining an orientation, including a facing direction and a device orientation, of the data storage device;
determining a first alphanumeric value represented by the one or more tap inputs and the one or more swipe inputs;
converting the orientation into a second alphanumeric value, where different orientations of the data storage device represent different alphanumeric values;
converting the pressure values into a third alphanumeric value, where different pressure levels represent different alphanumeric values;
determining a decryption value based at least partly on the first alphanumeric value, the second alphanumeric value, and the third alphanumeric value;
using the decryption value, decrypt key data for accessing a non-volatile memory of the data storage device; and
in response to determining that the one or more tap inputs and the one or more swipe inputs are valid, utilizing the key data to allow the host system access to the non-volatile memory of the data storage device.

16. The method of claim 15, wherein determining whether the one or more tap inputs and the one or more swipe inputs are valid comprises:
determining whether the one or more tap inputs are located at one or more particular locations of the touch-sensitive input device; and
determining whether the swipe inputs match one or more swipe patterns.

17. The method of claim 15, wherein:
the one or more tap inputs are associated with a first set of characters;
the one or more swipe inputs are associated with a second set of characters; and
determining whether the one or more tap inputs and the one or more swipe inputs are valid comprises:
determining whether the first set of characters matches a third set of characters; and
determining whether the second set of characters matches a fourth set of characters.

18. The method of claim 15, further comprising:
receiving an additional one or more tap inputs and an additional one or more swipe inputs from the touch-sensitive input device, wherein:
the one or more tap inputs and the one or more swipe inputs are associated with a first user; and
the additional one or more tap inputs and the additional one or more swipe inputs are associated with a second user;
determining whether the additional one or more tap inputs and the additional one or more swipe inputs are valid; and
allowing the host system access to the non-volatile memory in response to determining that the additional one or more tap inputs and the additional one or more swipe inputs are valid.

19. The method of claim 18, further comprising:
allowing the host system access to a first portion of the non-volatile memory in response to determining that the one or more tap inputs and the one or more swipe inputs are valid; and
allowing the host system access to a second portion of the non-volatile memory in response to determining that the additional one or more tap inputs and the additional one or more swipe inputs are valid.

20. A non-transitory computer-readable medium having stored thereon instructions that, when executed by a processor, cause the processor to perform operations comprising:
receiving one or more tap inputs and one or more swipe inputs from a touch-sensitive input device of a data storage device;
determining pressure values for the one or more tap inputs and the one or more swipe inputs;
determining whether the one or more tap inputs and the one or more swipe inputs are valid;
during entry of the one or more tap inputs and the one or more swipe inputs, determining an orientation, including a facing direction and a device orientation, of the data storage device;
determining a first alphanumeric value represented by the one or more tap inputs and the one or more swipe inputs;
converting the orientation into a second alphanumeric value, where different orientations of the data storage device represent different alphanumeric values;
converting the pressure values into a third alphanumeric value, where different pressure levels represent different alphanumeric values;
determining a decryption value based at least partly on the first alphanumeric value, the second alphanumeric value, and the third alphanumeric value;
using the decryption value, decrypt key data for accessing a non-volatile memory of the data storage device; and
in response to determining that the one or more tap inputs and the one or more swipe inputs are valid, utilizing the key data to allow a host system access to the non-volatile memory of the data storage device.

21. A portable data storage device configured to connect to a host system separate from the portable data storage device, the portable data storage device comprising:
a touch-sensitive input means;
a storage means; and
a processing means coupled to the storage means, the processing means configured to:
receive one or more tap inputs and one or more swipe inputs from the touch-sensitive input means;
determine pressure values for the one or more tap inputs and the one or more swipe inputs;
during entry of the one or more tap inputs and the one or more swipe inputs, determine an orientation, including a facing direction and a device orientation, of the portable data storage device;
determine a first alphanumeric value represented by the one or more tap inputs and the one or more swipe inputs;
convert the orientation into a second alphanumeric value, where different orientations of the portable data storage device represent different alphanumeric values;
convert the pressure values into a third alphanumeric value, where different pressure levels represent different alphanumeric values;
determine a decryption value based at least partly on the first alphanumeric value, the second alphanumeric value, and the third alphanumeric value;
determine whether the one or more tap inputs and the one or more swipe inputs are valid;
using the decryption value, decrypt key data for accessing the storage means; and in response to determining that the one or more tap inputs and the one or more swipe inputs are valid, utilize the key data to allow the host system access to the storage means.

\* \* \* \* \*